US012770373B2

(12) United States Patent
Chen et al.

(10) Patent No.: US 12,770,373 B2
(45) Date of Patent: Oct. 20, 2026

(54) METHOD AND SYSTEM FOR GENERATING A DETECTOR FOR PROCESS MONITORING

(71) Applicant: The Boeing Company, Arlington, VA (US)

(72) Inventors: Yang Chen, Westlake Village, CA (US); Deepak Khosla, Camarillo, CA (US); Brandon Michael Courter, Indianapolis, IN (US); Jeremy Daniel Howe, Everett, WA (US); Shane Edward Arthur, Kirkland, WA (US); Anders Eirik Heussy, Seattle, WA (US)

(73) Assignee: The Boeing Company, Arlington, VA (US)

( * ) Notice: Subject to any disclaimer, the term of this patent is extended or adjusted under 35 U.S.C. 154(b) by 360 days.

(21) Appl. No.: 18/333,967

(22) Filed: Jun. 13, 2023

(65) Prior Publication Data

US 2024/0420454 A1 Dec. 19, 2024

(51) Int. Cl.

*G06V 10/77* (2022.01)
*G06T 7/20* (2017.01)
*G06V 10/774* (2022.01)
*G06V 10/776* (2022.01)

(52) U.S. Cl.

CPC .............. *G06V 10/774* (2022.01); *G06T 7/20* (2013.01); *G06V 10/776* (2022.01)

(58) Field of Classification Search

CPC .... G06V 10/774; G06V 10/776; G06V 20/70; G06V 10/25; G06V 2201/06; G06T 7/20; G06T 7/0004; G06T 2207/30164

See application file for complete search history.

(56) References Cited

U.S. PATENT DOCUMENTS

| | | | | |
|---|---|---|---|---|
| 11,941,870 | B1 | 3/2024 | Kwon et al. | |
| 2019/0325259 | A1 | 10/2019 | Murphy | |
| 2021/0150275 | A1 * | 5/2021 | Schulter | G06V 20/58 |
| 2022/0198703 | A1 | 6/2022 | Evans et al. | |
| 2022/0212811 | A1 | 7/2022 | Khosla et al. | |
| 2022/0306088 | A1 * | 9/2022 | Rahimpour | B60W 30/0956 |
| 2023/0162488 | A1 | 5/2023 | Boulanger | |

(Continued)

FOREIGN PATENT DOCUMENTS

| | | |
|---|---|---|
| CN | 113807544 | * 12/2021 |
| CN | 115880720 | * 3/2023 |

(Continued)

OTHER PUBLICATIONS

Machine translation for CN 115880720 (Year: 2023).*

(Continued)

*Primary Examiner* — Qian Yang

(74) *Attorney, Agent, or Firm* — Walters & Wasylyna LLC

(57) ABSTRACT

A method of generating a detector is disclosed herein. The method includes obtaining a first training dataset including a first set of tagged images identifying a first object and obtaining a second training dataset including a second set of tagged images identifying a second object. A first parts-level detector is trained based on the first training dataset and a second parts-level detector is trained based on the second training dataset. A unified detector is trained based on the first training dataset and the second training dataset.

20 Claims, 3 Drawing Sheets

(56) References Cited

U.S. PATENT DOCUMENTS

| | | | |
|---|---|---|---|
| 2024/0420454 | A1 | 12/2024 | Chen et al. |
| 2024/0420471 | A1 | 12/2024 | Chen et al. |
| 2025/0252712 | A1 | 8/2025 | Khosla et al. |

FOREIGN PATENT DOCUMENTS

| | | | |
|---|---|---|---|
| CN | 115880720 | A | 3/2023 |
| WO | 2020146133 | A1 | 7/2020 |

OTHER PUBLICATIONS

Machine translation for CN 113807544 (Year: 2021).*
European Patent Office, Extended European Search Report, App. No. 24177405.8 (Oct. 7, 2024).
Supervisely: "Principle 1. AI for Videos labeling," XP093208831 (Feb. 2, 2023). URL: https://www.youtube.com/watch?v=7YUrXOseu-s&list=PLDo7qx2mEhsofZt0WgH968FuTM2bsnvUb&index=14.
USPTO, Notice of Allowance, U.S. Appl. No. 18/430,997 (May 22, 2026).

* cited by examiner

METHOD AND SYSTEM FOR GENERATING A DETECTOR FOR PROCESS MONITORING

FIELD

The present disclosure relates to a system and a method for generating a detector model, and in particular, to a detector model for process monitoring.

BACKGROUND

Machine learning is a process that analyzes to determine a model that maps input data to output data. One type of machine learning is supervised learning in which a model is trained with a dataset including known output data for a sufficient amount of input data. Once a model is trained, it may be deployed, i e., applied to new input data to predict the expected output.

Machine learning may be applied to regression problems (where the output data are numeric, e.g., a voltage, a pressure, a number of cycles) and to classification problems (where the output data are labels, classes, and/or categories, e.g., pass-fail, failure type, etc.). For both types of problems, a broad array of machine learning algorithms is available, with new algorithms the subject of active research. However, it can be very labor intensive to generate the dataset to train the model. Also, the quality of the dataset provided for training can greatly influence the ability of the model to predict the expected output from a new dataset.

Therefore, there exists a need to improve input datasets used to train a model and the expected outputs it predicts.

DESCRIPTION OF THE DRAWINGS

Some embodiments of the present disclosure are now described, by way of example only, and with reference to the accompanying drawings. The same reference number represents the same element or the same type of element on all drawings.

SUMMARY

Figure 1:
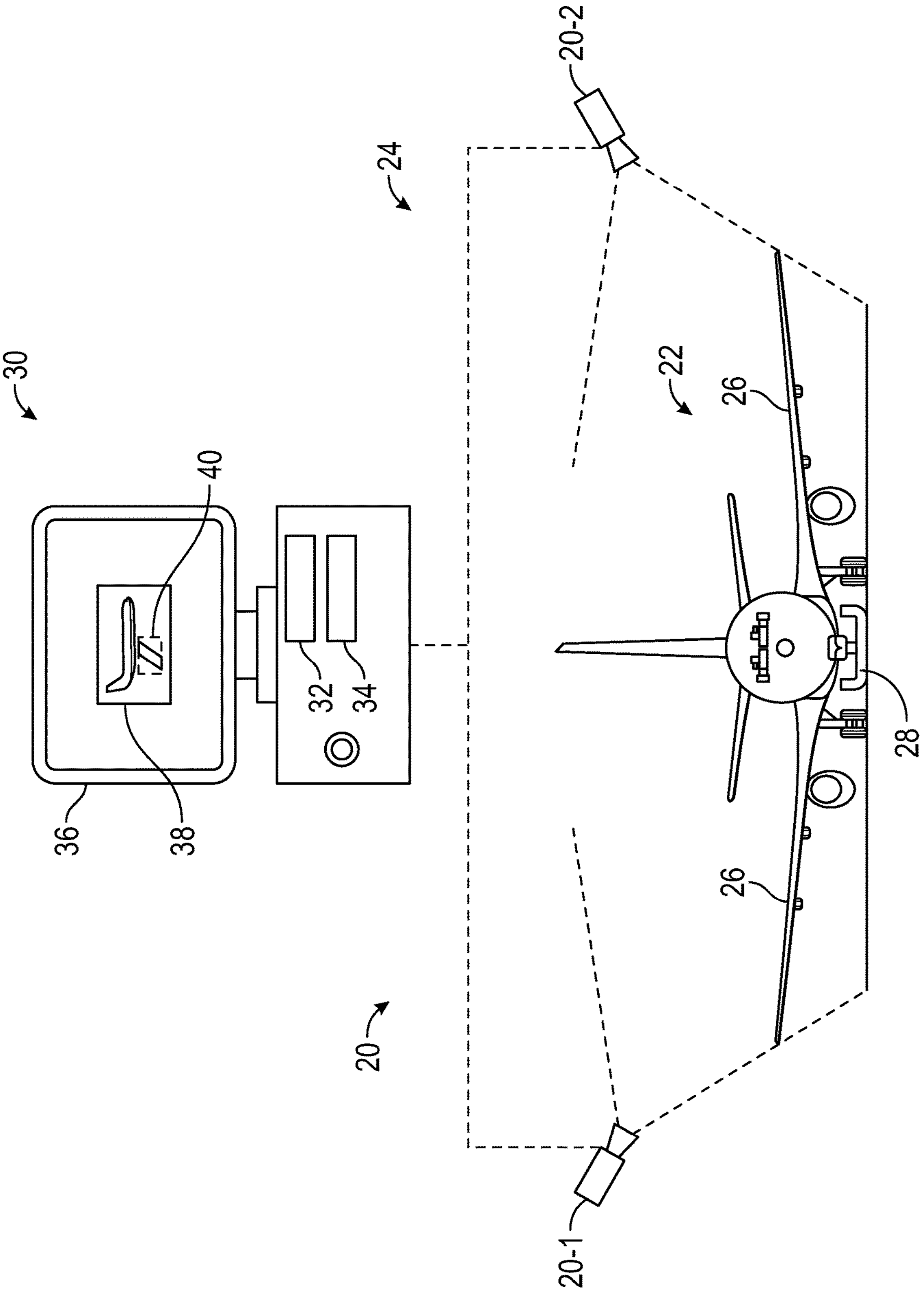
FIG. 1 illustrates an example camera system and computer system used in connection with an assembly process.

A method of generating a detector is disclosed herein. The method includes obtaining a first training dataset including a first set of tagged images identifying a first object and obtaining a second training dataset including a second set of tagged images identifying a second object. A first parts-level detector is trained based on the first training dataset and a second parts-level detector is trained based on the second training dataset. A unified detector is trained based on the first training dataset and the second training dataset.

In one or more embodiments of the method, the first training dataset is created by receiving a first image sequence with the first object identified in at least one image of the first image sequence, tracking the first object identified in the at least one image in the first image sequence, tagging a region of interest in each image in the first image sequence where the first object was tracked, and creating the first training dataset by collecting the region of interest from each image in the first image sequence where the first object was tracked.

In one or more embodiments, the method includes obtaining the first training dataset includes eliminating false negative tags of the first object by verifying a presence of the first object in the first training dataset against a ground-truth timeline for the first object.

In one or more embodiments, the method includes creating the second training dataset by receiving a second image sequence with the second object identified in at least one image of the second image sequence. The method includes tracking the second object identified in the at least one image in the second image sequence. The method further includes tagging a region of interest in each image in the second image sequence where the second object was tracked and creating the second training dataset by collecting the region of interest from each image in the second image sequence where the second object was tracked.

In one or more embodiments of the method, the second object includes the first object located in a different configuration.

In one or more embodiments, the method includes obtaining the second training dataset includes eliminating false negative tags of the second object by verifying a presence of the second object against a ground-truth timeline for the second object.

In one or more embodiments, the method includes training the unified detector based on the first training dataset includes utilizing the second parts-level detector for tagging a region of interest where the second object was tracked in each image of the first training dataset.

In one or more embodiments, the method includes training the unified detector based on the second training dataset includes utilizing the first parts-level detector for tagging a region of interest where the first object was tracked in each image of the second training dataset.

In one or more embodiments, the method includes training the unified detector includes eliminating false negative tags of the first object in the second training dataset by verifying a presence of the first object against a ground-truth timeline for the first object in the second training dataset.

In one or more embodiments, the method includes training the unified detector includes eliminating false negative tags of the second object in the first training dataset by verifying a presence of the second object against a ground-truth timeline for the second object in the first training dataset.

In one or more embodiments, the method includes obtaining a plurality of additional training datasets with each of the plurality of additional training datasets including a set of tagged images identifying a corresponding one of a plurality of additional objects, training a plurality of additional parts-level detectors based on the plurality of additional training datasets, and training the unified detector based on the first training dataset, the second training dataset, and the plurality of additional training datasets.

In one or more embodiments, the method includes obtaining a plurality of additional training datasets with each of the plurality of additional training datasets including a set of tagged images identifying a corresponding one of a plurality of additional objects. The method includes training a single additional parts-level detectors based on the plurality of additional training datasets when a ground-truth timeline for the plurality of additional objects is non-overlapping. The method further includes training the unified detector based on the first training dataset, the second training dataset, and the plurality additional training datasets.

In one or more embodiments of the method, the plurality of additional objects includes a single object positioned in a plurality of different configurations.

In one or more embodiments, the method includes training the single additional parts-level detector based on the plurality of additional training datasets includes eliminating false negative tags of the plurality of additional objects by verifying a presence of each of the plurality of additional objects in the plurality of additional training datasets against a ground-truth timeline for each of the plurality of additional objects.

In one or more embodiments of the method, the first and second set of tagged images include tags providing an object identifier, a location of a bounding box highlighting the corresponding object, and a size of the bounding box.

A system for detecting objects is disclosed herein. The system includes at least one camera configured to capture a plurality of images and a controller. The controller is configured to obtain a first training dataset including a first set of tagged images identifying a first object and obtain a second training dataset including a second set of tagged images identifying a second object. The controller is also configured to train a first parts-level detector based on the first training dataset and train a second parts-level detector based on the second training dataset in order to train a unified detector based on the first training dataset and the second training dataset.

In one or more embodiments of the system, the first training dataset is created by receiving a first image sequence with the first object identified in at least one image of the first image sequence and tracking the first object identified in the at least one image in the first image sequence. The first training dataset is further created by tagging a region of interest in each image in the first image sequence where the first object was tracked and creating the first training dataset by collecting the region of interest from each image in the first image sequence where the first object was tracked.

In one or more embodiments of the system, the second training dataset is created by receiving a second image sequence with the second object identified in at least one image of the second image sequence and tracking the second object identified in the at least one image in the second image sequence. The second training dataset is further created by tagging a region of interest in each image in the second image sequence where the second object was tracked and creating the second training dataset by collecting the region of interest from each image in the second image sequence where the second object was tracked.

A non-transitory computer readable medium embodying programmed instructions which, when executed by a processor, are operable for performing a method is disclosed herein. The method includes obtaining a first training dataset including a first set of tagged images identifying a first object and obtaining a second training dataset including a second set of tagged images identifying a second object. The method includes training a first parts-level detector based on the first training dataset and training a second parts-level detector based on the second training dataset. The method further includes training a unified detector based on the first training dataset and the second training dataset.

In one or more embodiments of the method, the first training dataset and the second training dataset are created by receiving a first image sequence with the first object identified in at least one image of the first image sequence and receiving a second image sequence with the second object identified in at least one image of the second image sequence. The method includes tracking the first object identified in the at least one image in the first image sequence and tracking the second object identified in the at least one image in the second image sequence. The method further includes tagging a region of interest in each image in the first image sequence where the first object was tracked and tagging a region of interest in each image in the second image sequence where the second object was tracked. The method further includes creating the first training dataset by collecting the region of interest from each image in the first image sequence where the first object was tracked and creating the second training dataset by collecting the region of interest from each image in the second image sequence where the second object was tracked.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below, but by the claims and their equivalents.

FIG. 1 illustrates an example camera system 20 having a first camera 20-1 and a second camera 20-2 for monitoring an assembly process, such as an assembly of an airplane 22 on an assembly line. The camera system 20 is in communication with a computer system 30 that receives images from the camera system 20. Although the illustrated example of the camera system 20 and computer system 30 is shown in relation to an assembly process, this disclosure applies to other areas where it is desirable to perform object detection.

While the computer system 30 of FIG. 1 is depicted as a unitary computer module for illustrative simplicity, the computer system 30 can be physically embodied as one or more processing nodes having a non-transitory computer-readable storage medium 34, i.e., application-sufficient memory, and associated hardware and software, such as but not limited to a high-speed clock, timer, input/output circuitry, buffer circuitry, and the like. The computer-readable storage medium 34 may include enough read only memory, for instance magnetic or optical memory. Computer-readable code or instructions embodying the methods described below may be executed during operation of the computer system 30. To that end, the computer system 30 may encompass one or more processors 32, e.g., logic circuits, application-specific integrated circuits (ASICs), central processing units, microprocessors, and/or other requisite hardware as needed to provide the programmed functionality described herein. A display screen 36 may be connected to or in communication with the computer readable medium 34 and processor(s) 32 to facilitate a graphical interface for a user implementing this disclosure as set forth below.

In the illustrated example, the cameras 20-1 and 20-2 are mounted above an aircraft assembly line 24 on opposite lateral sides of the aircraft 22 for the purpose of monitoring the process of assembling the aircraft 22. Depending on the process being monitored, the cameras 20-1 and 20-2 can capture images at a 4K resolution and up to thirty or more frames per second. Alternatively, the cameras 20-1, 20-2 can capture images at a lower resolution, such as 960×540, and at a rate of one image every 15 seconds. The variation in camera resolution and image capture rate depends on the size of the objects being detected and a length of time that the objects remain in a field of view of the cameras 20-1, 20-2. Also, collecting images at a lower resolution and rate reduces an amount of data that needs to be stored and handled by the computer system 30.

Also, this disclosure applies to camera systems 20 that use only a single camera or more than two cameras to capture images of a specific area. The number of cameras utilized for process monitoring depends on the required view needed to include the objects to be detected as some of the cameras may have an obstructed view of one or more objects.

Figure 2:
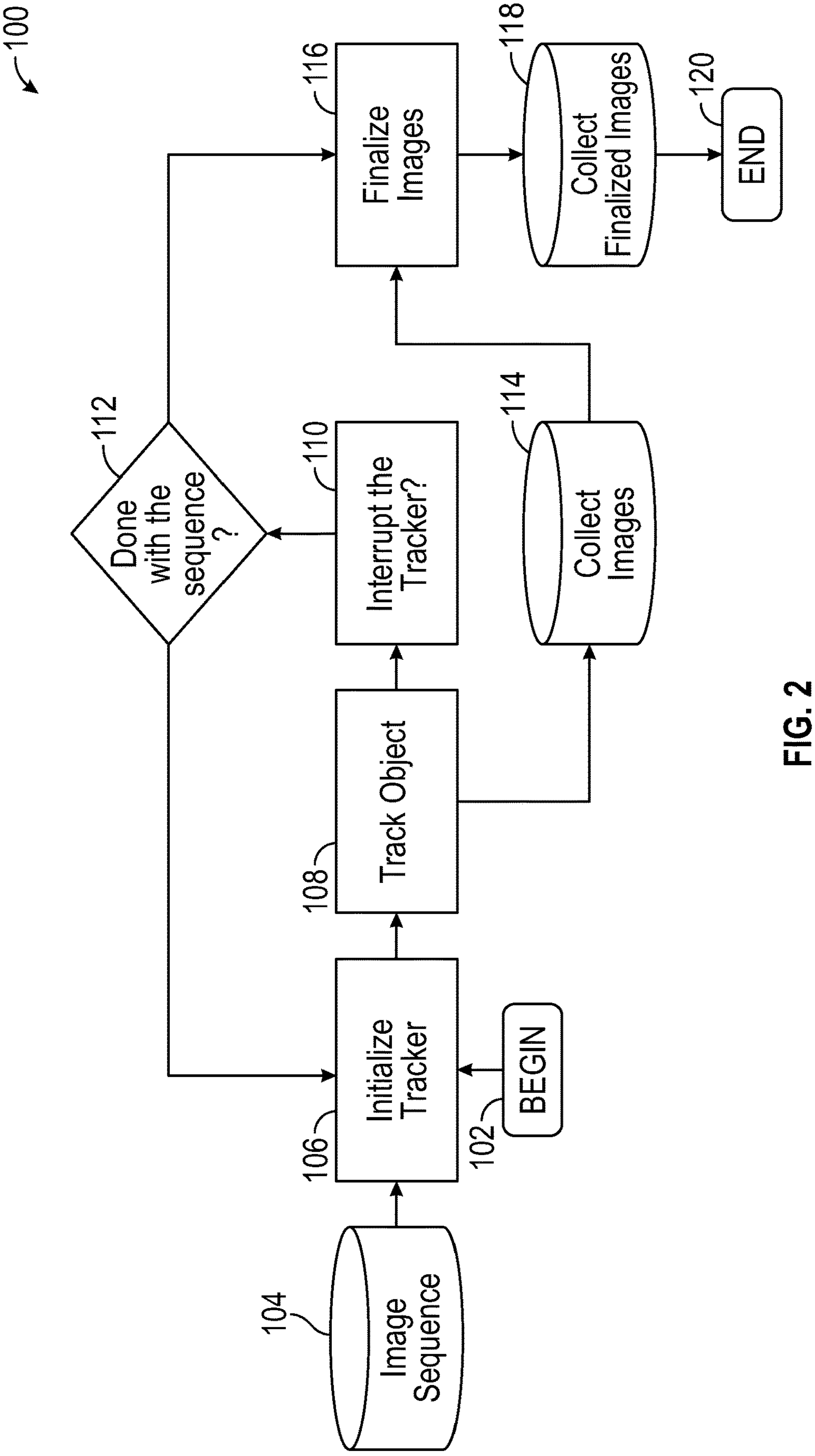
FIG. 2 illustrates an example method of generating a training dataset for an object for a parts-level detector.

FIG. 2 illustrates an example method 100 of generating a training dataset for a specific object for training a detection model for a detector, such as a parts-level detector. The method 100 is implemented for each desired object to be tracked from an image sequence that includes at least one image with the desired object. The method 100 is initiated at Block 102 and from Block 102 the method 100 receives an image sequence (Block 104) at Block 106. At Block 106, the desired object is highlighted in at least one of the images from the sequence in Block 104. In one example, the image from the sequence at or near a first appearance of the object is utilized to highlight the object. The object can be highlighted by a user of the computer system 30. In one example, the object is highlighted by a user with a bounding box 40 that surrounds the object in the image 38 (See FIG. 1). The user can create the bounding box by placing a rectangle in the image 38 that surrounds the desired object. A location in the image and size of the rectangle are recorded or tagged with the image and used to track the object in the other images in the image sequence at Block 108.

When the object is tracked between the sequence of images at Block 108, a location of the bounding box in the specific image and a size of the rectangle identified by the user from Block 106 are used by a tracking algorithm to "track" or follow the object of interest through the image sequence. For each image in the image sequence, the tracker will attempt to locate the same object of interest, and record information regarding the object of interest in the memory 34 of the computer system 30 associated with each image where the object was identified. The information tagged to each frame can include a location and size of the rectangle, a label identifying the object, such as a name or class of the object of interest, or a cropped image region of interest (ROI) with the object defined by the rectangle.

The object tracking process may be interrupted at Block 110 if the tracking algorithm has determined that the object of interest no longer exists in the image or is otherwise "lost" (e.g., this can be indicated by a confidence score below a set confidence threshold). Also, the user can intervene due to an error in the tracking results as judged by the user, e.g., when the tracker has locked on to an object other than the one the user initially selected.

At Block 112, the method 100 can return to Block 106 to modify the bounding box in the initial image identifying the object to improve the tracking of the object of interest again. Alternatively, when returning to Block 106, the user can select the image in the sequence where the object was lost by the tracking algorithm and highlight the correct object of interest in that image to allow the object to be tracked again in Block 108. The ability to restart the tracking algorithm at the place of failure and continue without having to reevaluate the same images from the image sequence again reduces time needed to evaluate the image sequence.

At Block 114, the location and size of the rectangle, label identifying the object, and the cropped image region for each image in the image sequence are collected. The user can review the region of interest from each image in the sequence at Block 116 to confirm that the correct object of interest is identified in the region of interest as part of finalizing the collected images with associated information. If any of the regions of interest did not identify the correct object of interest, those regions of interest can be deleted from the finalized images.

In one example, the user finalizes images by viewing them on the display 36 of the computer system 30. Once the user has confirmed that the correct regions of interest have been identified in the images, the finalized images are collected at Block 118 and the method can end at Block 120. The finalized images can be stored in the memory 34 of the computer system 30 or at another location, such as in the cloud. The finalized images form a training dataset for a parts-level or first-level detector for the object identified in the image sequence as described below.

The method 100 can be repeated for the same or different image sequences showing another object of interest or configuration of the object to form a training dataset for that specific object or configuration. Since the user involvement is limited to initiating the tracking of the object of interest, the method 100 eliminates the need for the user to identify the object of interest from each image in the image sequence by utilizing image tracking throughout the image sequence. This reduces the time and labor needed to create or update the training dataset for the object.

Tracking of the object of interest performed at least in Blocks 106 and 108 can be accomplished by many different available tracking algorithms, such as simple trackers based on a cross-correlation coefficient. These trackers can be used in situations where the appearance and position of the object of interest remains relatively stable. However, other tracker algorithms can be used depending on the object being tracked.

One feature of this disclosure is a simplified tracking procedure for the object of interest by treating a single object as a separate object to be tracked as it moves between different configurations or classes for the same object. Therefore, if objects of interest are positioned in different "configurations," they are defined as different "objects" for the object tracking that occurs in the method 100. For the example of objects associated with assembling the aircraft 22, aircraft wings 26 are presented in several different configurations such as when they are first towed to the factory floor ("delivered"), when they are lifted by a crane and moved to the support stands on the sides of fuselage (known as "loaded"), and when they are mated to the fuselage ("attached"). Therefore, a single object, the wing 26 would create three different configurations or classes with corresponding images sequences that would be evaluated by the method 100 to create different training datasets for each configuration.

In one example embodiment, at least one of the cameras 20-1, 20-2 captures an image of the assembly floor every 15 seconds. This reduces the burden of storing and processing large amounts of image data when the objects of interest are not moving quickly or frequently. In prior art approaches, tracking the movement of objects through discontinuous image frames was difficult to maintain at a high level of accuracy. However, this disclosure utilizes end states of where the objects of interest (in this example, the wings) are rather than how they are moved from one place to another during the assembly process. Therefore, having an object of interest in a "configuration" refers to the object in a particular state of assembly, e.g., "Wing LEFT Delivered", "Wing LEFT Loaded", etc.

Furthermore, an object of interest can be in different configuration even though its location has not changed. One example of such an object is a cradle 28 that supports a front end of the fuselage of the airplane 22. During the assembly process, the cradle 28 will transition from a configuration of supporting the weight of the fuselage ("Cradle Support Plane") to one of not supporting the fuselage ("Cradle Not Supp Plane"), leaving the fuselage to be supported by the front nose gear. This is called "Downjack" and is an important milestone in the assembly process of most airplanes 22 which can be identified by the detector model disclosed herein.

For object detection model training to occur, positive training datasets are created based on the results of the method 100. The positive training datasets include images containing positive training samples of the object tagged with a label identifying the object at a location of the object, and a size of every object of interest to be detected in each of the images. Also, datasets of images without positive training samples are useful for the training object detection models.

The positive training datasets can be generated from the method 100 discussed above and the no positive training samples can use images of the same assembly factory floor before the object of interest is loaded to the workspace and before any components to be detected are present. This ensures that samples will not include false negatives.

Regarding the tagged images, the tag-by-tracking process of the method 100 produces training datasets that are generated one object at a time for each (time-stamped) image in the image sequence that forms the training dataset. When the same image sequence is used to identify more than one object of interest, tags for different objects in the same image are merged into a single file for purposes of training the detection model. Also, if the tagging process is not exhaustive (i.e., if the process fails to tag some objects in some of the images, or some of the tagging results were accidently deleted), the training dataset may inadvertently create negative training examples from positive images, i.e., a false negative identification. That is, if the tag-by-tracking process of the method 100 fails to tag an object of interest in some images, a situation is created where the object exists but is not tagged, effectively making negative samples for training (i.e., telling the training algorithm for the detection model that the objects do not exist when in fact they do). This can cause harm to the training and reduce the performance of the resulting detection models.

To avoid inadvertently introducing negative training examples, an automated verification process is created in which such negative examples are eliminated. This process, as outlined below, requires a ground-truth timeline file to be created by examining each image sequence, and identifying and recording the times when each object first appears and when it disappears, or, broadly using the "generalized object detection" terminology, when a configuration becomes true for the related object and when the configuration is no longer true. This ground-truth timeline is stored in a "ground-truth" file. In the illustrated example, every image sequence in the training dataset will have a ground-truth file. The ground-truth timeline provides a verification process that eliminates false negatives from the training dataset and can easily create negative training data from using images with time stamps that include time intervals without the object of interest.

For a conventional object detection training approach, once the tagging process and the verification process are complete, a detector is trained using all the tagged training images in the training datasets less the ones excluded from the verification process described above. However, doing so puts a heavy burden on the tagging process even when we are using the semi-automated tagging process of the method 100, because it requires tagging every object of interest in every training image sequence used. As more training data will generally result in a better performing detection model, there is an intrinsic conflict between the need to have more training data and the exponential growth in the resource (time and effort) needed for tagging the objects in the training data.

This disclosure reduces the burden of tagging objects in training images by implementing a two-level detector training process that utilizes individual parts-level detectors and a unified or second level detector that can detect each object or objects from each of the individual parts-level detectors. The individual parts-level detectors are trained first, with each containing a small number of objects of interest and configurations followed by training the second level or unified detector that comprises all the objects of interest and corresponding configurations into a single detector.

For the parts-level detector training, a group of a small number of objects (often just one or two objects) and corresponding configurations are selected. For example, two configurations for the tail cone, such as "TailCone Delivered" and "TailCone Attached" are combined to train a single parts-level detector. In this example, only one actual object of interest, a TailCone, is involved, and the two configurations represent two stages in the assembly process to be monitored. A second example is the four states "Wing LEFT Delivered", "Wing RIGHT Delivered", "Wing LEFT Loaded" and "Wing RIGHT Loaded" combined into a single parts-level detector, which has two objects of interest, Wing LEFT and Wing RIGHT, each with two configurations.

For training data verification of the parts-level detector, a timeline for the ground-truth files is created for each of the training sequences as discussed above to eliminate any false negatives. Furthermore, a set of images that do not contain any objects detected in the parts-level detector is helpful to train the parts-level detector.

For the second level of the two-level detector training, the unified detector is trained. The unified detector includes all the objects of interest and corresponding configurations from the parts-level detectors. The unified detector can then be deployed to produce data for assembly process monitoring.

The two-level detector training processes allows the parts-level detector to be trained with much less training data. This is because each parts-level detector contains only a small number of objects of interest, such as one or two objects of interest, and the corresponding configurations for the objects of interest with only a subset of training data most relevant to these objects or configurations to be tagged. One feature of this is a reduction in tagging requirements compared with having to tag all the objects of interest and corresponding configurations in all training datasets. In one example, only two to four image sequences are tagged to create the training datasets for each parts-level detector.

The two-level detector training process is also faster because the parts-level detectors contain fewer objects of interest and configurations such that it is faster to train and achieve high levels of detection performance from smaller training datasets. Also, the parts-level detectors can be managed separately from each other and the second level unified detector. This allows for making incremental improvements to system performance possible by revising and improving the individual parts-level detectors independently and then re-training the unified detector from the revised parts-level detector.

Figure 3:
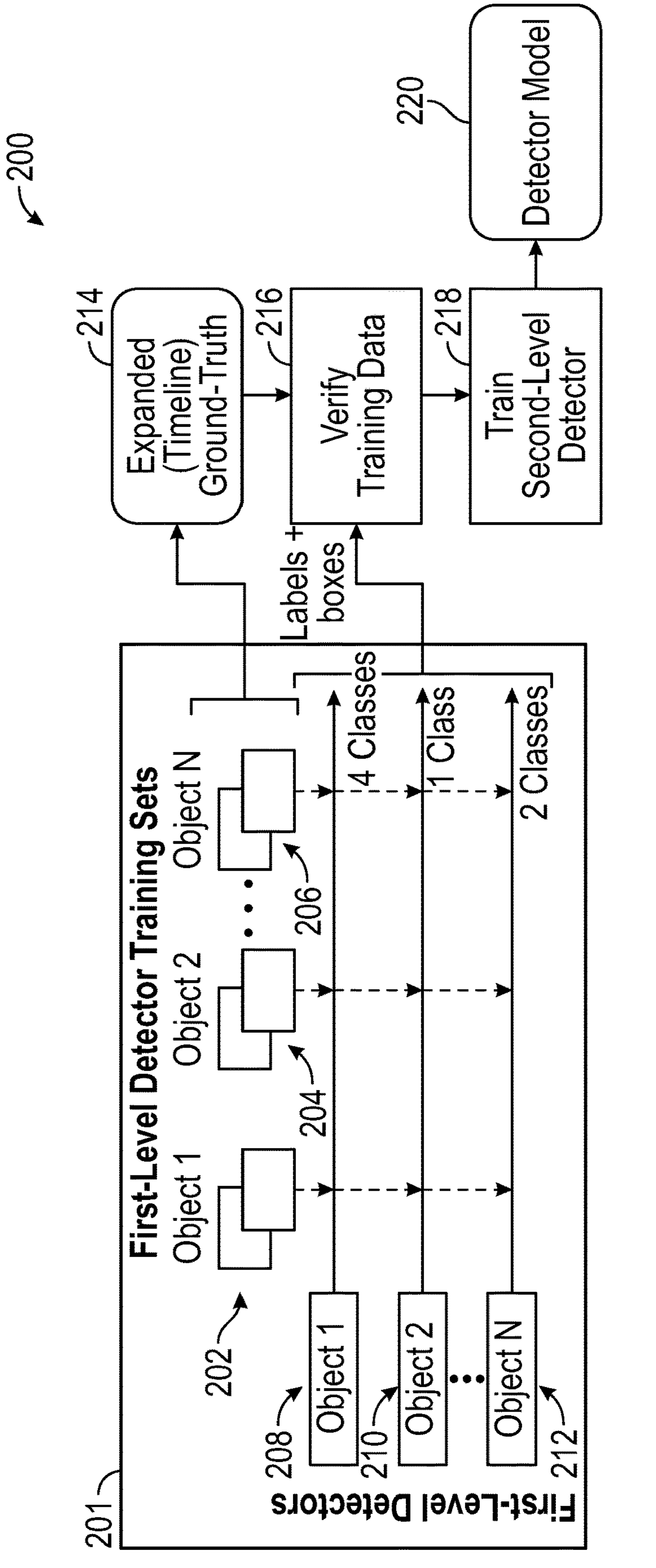
FIG. 3 illustrates an example method of training a unified detector.

Furthermore, an example method 200 of training the second level or unified detector is illustrated in FIG. 3. The method 200 allows for an automated process of training the unified detector. Once the parts-level detectors 208, 210, 212 are trained, they are used to process all the training data 202, 204, 206 to produce "tags" for all the objects of interest and corresponding configurations needed (Block 210) for training the unified detector.

With the method 200, the classes or configurations of the unified detector are the union of all the classes/configurations in the parts level detectors. As such, the objects and configurations or classes included in each of the parts-level detectors are combined into a single unified detector that will be able to detect each of the objects corresponding configurations.

Additionally, the training data utilized for training the parts-level detector is augmented at Block 201 before being used to train the unified detector. This is because image tagging for the specific training dataset is only performed for the objects that the parts-level detector is training for. Therefore, if an image contains a first object that is not detected by parts-level detector, that image cannot be used for training the unified detector unless the first object is also identified in the image. Otherwise, the first object in the image will create a false negative example for training as discussed above. To eliminate the false negative examples for training the unified detector, the parts-level detectors are used to generate tags for all the image sequences used to generate each of the individual parts-level detectors.

As shown in FIG. 3, Block 201 applies the trained parts-level detectors to all training data (originally collected for the parts-level detector training) and detects all objects in each of the image sequences. This allows additional training data not used before if necessary (e.g., those that we put aside for testing the parts-level detectors). This step generates tags for the training images automatically. The parts-level detectors trained with the above approach are very effective at detecting the objects in the images they are trained on and new images they are not trained on as well. This provides consistent and high-quality "tags" in terms of the class labels and the object bounding boxes (i.e., the "tags") associated with each of the images.

The method 200 verifies the training data (Block 216) against an expanded (timeline) ground-truth from Block 214. For the purposes of training the parts-level detectors, the ground-truth timeline only included the objects contained in the specific parts-level detector. However, for the unified detector, the ground truth is expanded to include all objects of the unified detector, which includes all objects in all parts-level detectors. As in the case for parts-level detectors, the verification process produces a set of images (with tags produced by the parts-level detectors) that are used as training data, and a set of images that can be used as negative training samples.

The amount of training data created at Block 216 can be several times larger than the sum of training data used in the parts-level detector training, which contributes to higher quality (unified) detector as a result. With the training data developed at Block 216, the unified or second-level detector can be trained at Block 218 to create the detector model at Block 220 for process monitoring of assembly lines on a factory floor or any other location.

The following Clauses provide example configurations of systems and methods for generating a detector for process monitoring with the system 20 of FIG. 1.

Clause 1: A method generating a detector, the method comprising: obtaining a first training dataset including a first set of tagged images identifying a first object; obtaining a second training dataset including a second set of tagged images identifying a second object; training a first parts-level detector based on the first training dataset; training a second parts-level detector based on the second training dataset; and training a unified detector based on the first training dataset and the second training dataset.

Clause 2: The method of clause 1, wherein the first training dataset is created by: receiving a first image sequence with the first object identified in at least one image of the first image sequence; tracking the first object identified in the at least one image in the first image sequence; tagging a region of interest in each image in the first image sequence where the first object was tracked; and creating the first training dataset by collecting the region of interest from each image in the first image sequence where the first object was tracked.

Clause 3: The method of clauses 1-2, wherein obtaining the first training dataset includes eliminating false negative tags of the first object by verifying a presence of the first object in the first training dataset against a ground-truth timeline for the first object.

Clause 4: The method of clauses 1-3, wherein the second training dataset is created by: receiving a second image sequence with the second object identified in at least one image of the second image sequence; tracking the second object identified in the at least one image in the second image sequence; tagging a region of interest in each image in the second image sequence where the second object was tracked; and creating the second training dataset by collecting the region of interest from each image in the second image sequence where the second object was tracked.

Clause 5: The method of clauses 1-4, wherein the second object includes the first object located in a different configuration.

Clause 6: The method of clauses 1-5, wherein obtaining the second training dataset includes eliminating false negative tags of the second object by verifying a presence of the second object against a ground-truth timeline for the second object.

Clause 7: The method of clauses 1-6, wherein training the unified detector based on the first training dataset includes utilizing the second parts-level detector for tagging a region of interest where the second object was tracked in each image of the first training dataset.

Clause 8: The method of clauses 1-7, wherein training the unified detector based on the second training dataset includes utilizing the first parts-level detector for tagging a region of interest where the first object was tracked in each image of the second training dataset.

Clause 9: The method of clauses 1-8, wherein training the unified detector includes eliminating false negative tags of the first object in the second training dataset by verifying a presence of the first object against a ground-truth timeline for the first object in the second training dataset.

Clause 10: The method of clauses 1-9, wherein training the unified detector includes eliminating false negative tags of the second object in the first training dataset by verifying a presence of the second object against a ground-truth timeline for the second object in the first training dataset.

Clause 11: The method of clauses 1-10, including: obtaining a plurality of additional training datasets with each of the plurality of additional training datasets including a set of tagged images identifying a corresponding one of a plurality of additional objects; training a plurality of additional parts-level detectors based on the plurality of additional training datasets; and training the unified detector based on the first training dataset, the second training dataset, and the plurality of additional training datasets.

Clause 12: The method of clauses 1-11, including: obtaining a plurality of additional training datasets with each of the plurality of additional training datasets including a set of tagged images identifying a corresponding one of a plurality of additional objects; training a single additional parts-level detectors based on the plurality of additional training datasets when a ground-truth timeline for the plurality of additional objects is non-overlapping; and training the unified detector based on the first training dataset, the second training dataset, and the plurality additional training datasets.

Clause 13: The method of clauses 1-12, wherein the plurality of additional objects includes a single object positioned in a plurality of different configurations.

Clause 14: The method of clauses 1-13, wherein training the single additional parts-level detector based on the plurality of additional training datasets includes eliminating false negative tags of the plurality of additional objects by verifying a presence of each of the plurality of additional objects in the plurality of additional training datasets against a ground-truth timeline for each of the plurality of additional objects.

Clause 15: The method of clauses 1-14, wherein the first and second set of tagged images include tags providing an object identifier, a location of a bounding box highlighting the corresponding object, and a size of the bounding box.

Clause 16. A system for detecting objects, the system comprising: at least one camera configured to capture a plurality of images; and a controller configured to: obtain a first training dataset including a first set of tagged images identifying a first object; obtain a second training dataset including a second set of tagged images identifying a second object; train a first parts-level detector based on the first training dataset; train a second parts-level detector based on the second training dataset; and train a unified detector based on the first training dataset and the second training dataset.

Clause 17: The system of clause 16, wherein the first training dataset is created by: receiving a first image sequence with the first object identified in at least one image of the first image sequence; tracking the first object identified in the at least one image in the first image sequence; tagging a region of interest in each image in the first image sequence where the first object was tracked; and creating the first training dataset by collecting the region of interest from each image in the first image sequence where the first object was tracked.

Clause 18: The system of clauses 16-17, wherein the second training dataset is created by: receiving a second image sequence with the second object identified in at least one image of the second image sequence; tracking the second object identified in the at least one image in the second image sequence; tagging a region of interest in each image in the second image sequence where the second object was tracked; and creating the second training dataset by collecting the region of interest from each image in the second image sequence where the second object was tracked.

Clause 19: A non-transitory computer readable medium embodying programmed instructions which, when executed by a processor, are operable for performing a method comprising: obtaining a first training dataset including a first set of tagged images identifying a first object; obtaining a second training dataset including a second set of tagged images identifying a second object; training a first parts-level detector based on the first training dataset; training a second parts-level detector based on the second training dataset; and training a unified detector based on the first training dataset and the second training dataset.

Clause 20: The non-transitory computer readable medium of clause 19, wherein the first training dataset and the second training dataset are created by: receiving a first image sequence with the first object identified in at least one image of the first image sequence; receiving a second image sequence with the second object identified in at least one image of the second image sequence; tracking the first object identified in the at least one image in the first image sequence; tracking the second object identified in the at least one image in the second image sequence; tagging a region of interest in each image in the first image sequence where the first object was tracked; tagging a region of interest in each image in the second image sequence where the second object was tracked; creating the first training dataset by collecting the region of interest from each image in the first image sequence where the first object was tracked; and creating the second training dataset by collecting the region of interest from each image in the second image sequence where the second object was tracked.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method for generating a detector, the method comprising:

obtaining a first training dataset including a first set of tagged images identifying a first object;

obtaining a second training dataset including a second set of tagged images identifying a second object;

training a first parts-level detector to detect the first object using the first training dataset;

training a second parts-level detector to detect the second object using the second training dataset;

verifying a presence of the first object in the second training dataset to form a unified training dataset;

verifying a presence of the second object in the first training dataset to expand the unified training dataset; and training a second-level detector to detect the first object and the second object using the unified training dataset.

2. The method of claim 1, wherein the first training dataset is created by:

receiving a first image sequence with the first object identified in at least one image of the first image sequence;

tracking the first object identified in the at least one image in the first image sequence;

tagging a region of interest in each image in the first image sequence where the first object was tracked; and creating the first training dataset by collecting the region of interest from each image in the first image sequence where the first object was tracked.

3. The method of claim 1, wherein obtaining the first training dataset includes eliminating false negative tags of the first object by verifying a presence of the first object in the first training dataset against a ground-truth timeline for the first object.

4. The method of claim 1, wherein the second training dataset is created by:

receiving a second image sequence with the second object identified in at least one image of the second image sequence;

tracking the second object identified in the at least one image in the second image sequence;

tagging a region of interest in each image in the second image sequence where the second object was tracked; and creating the second training dataset by collecting the region of interest from each image in the second image sequence where the second object was tracked.

5. The method of claim 1, wherein the second object includes the first object located in a different configuration.

6. The method of claim 1, wherein obtaining the second training dataset includes eliminating false negative tags of the second object by verifying a presence of the second object against a ground-truth timeline for the second object.

7. The method of claim 1, further comprising:

utilizing the second parts-level detector for tagging a region of interest where the second object was tracked in each image of the first training dataset.

8. The method of claim 1, further comprising:

utilizing the first parts-level detector for tagging a region of interest where the first object was tracked in each image of the second training dataset.

9. The method of claim 1, wherein the verifying of the presence of the first object in the second training dataset includes eliminating false negative tags of the first object in the second training dataset by verifying a presence of the first object against a ground-truth timeline for the first object in the second training dataset.

10. The method of claim 1, wherein the verifying of the presence of the second object in the first training dataset includes eliminating false negative tags of the second object in the first training dataset by verifying a presence of the second object against a ground-truth timeline for the second object in the first training dataset.

11. The method of claim 1, including:

obtaining a plurality of additional training datasets with each of the plurality of additional training datasets including a set of tagged images identifying a corresponding one of a plurality of additional objects;

training a plurality of additional parts-level detectors based on the plurality of additional training datasets; and training the second-level detector based on the first training dataset, the second training dataset, and the plurality of additional training datasets.

12. The method of claim 1, including:

obtaining a plurality of additional training datasets with each of the plurality of additional training datasets including a set of tagged images identifying a corresponding one of a plurality of additional objects;

training a single additional parts-level detectors based on the plurality of additional training datasets when a ground-truth timeline for the plurality of additional objects is non-overlapping; and training the second-level detector based on the first training dataset, the second training dataset, and the plurality additional training datasets.

13. The method of claim 12, wherein the plurality of additional objects includes a single object positioned in a plurality of different configurations.

14. The method of claim 12, wherein training the single additional parts-level detector based on the plurality of additional training datasets includes eliminating false negative tags of the plurality of additional objects by verifying a presence of each of the plurality of additional objects in the plurality of additional training datasets against a ground-truth timeline for each of the plurality of additional objects.

15. The method of claim 1, wherein the first and second set of tagged images include tags providing an object identifier, a location of a bounding box highlighting the corresponding object, and a size of the bounding box.

16. A system for detecting objects, the system comprising:

at least one camera configured to capture a plurality of images; and a controller configured to:

obtain a first training dataset including a first set of tagged images identifying a first object;

obtain a second training dataset including a second set of tagged images identifying a second object;

train a first parts-level detector to detect the first object using the first training dataset;

train a second parts-level detector to detect the second object using the second training dataset;

verify a presence of the first object in the second training dataset to form a unified training dataset;

verify a presence of the second object in the first training dataset to expand the unified training dataset; and train a second-level detector to detect the first object and the second object using the unified training dataset.

17. The system of claim 16, wherein the first training dataset is created by:

receiving a first image sequence with the first object identified in at least one image of the first image sequence;

tracking the first object identified in the at least one image in the first image sequence;

tagging a region of interest in each image in the first image sequence where the first object was tracked; and creating the first training dataset by collecting the region of interest from each image in the first image sequence where the first object was tracked.

18. The system of claim 16, wherein the second training dataset is created by:

receiving a second image sequence with the second object identified in at least one image of the second image sequence;

tracking the second object identified in the at least one image in the second image sequence;

tagging a region of interest in each image in the second image sequence where the second object was tracked; and creating the second training dataset by collecting the region of interest from each image in the second image sequence where the second object was tracked.

19. A non-transitory computer readable medium embodying programmed instructions which, when executed by a processor, are operable for performing a method comprising:

obtaining a first training dataset including a first set of tagged images identifying a first object;

obtaining a second training dataset including a second set of tagged images identifying a second object;

training a first parts-level detector to detect the first object using the first training dataset;

training a second parts-level detector to detect the second object using the second training dataset;

verifying a presence of the first object in the second training dataset to form a unified training dataset;

verifying a presence of the second object in the first training dataset to expand the unified training dataset; and training a second-level detector to detect the first object and the second object using the unified training dataset.

20. The non-transitory computer readable medium of claim 19, wherein the first training dataset and the second training dataset are created by:

receiving a first image sequence with the first object identified in at least one image of the first image sequence;

receiving a second image sequence with the second object identified in at least one image of the second image sequence;

tracking the first object identified in the at least one image in the first image sequence;

tracking the second object identified in the at least one image in the second image sequence;

tagging a region of interest in each image in the first image sequence where the first object was tracked;

tagging a region of interest in each image in the second image sequence where the second object was tracked;

creating the first training dataset by collecting the region of interest from each image in the first image sequence where the first object was tracked; and creating the second training dataset by collecting the region of interest from each image in the second image sequence where the second object was tracked.

* * * * *